(12) United States Patent
Friedman

(10) Patent No.: US 8,657,340 B2
(45) Date of Patent: Feb. 25, 2014

(54) SLEEPER BERTH OCCUPANTS ROLLOVER PROTECTION

(76) Inventor: Keith Friedman, Austin, TX (US)

( * ) Notice: Subject to any disclaimer, the term of this patent is extended or adjusted under 35 U.S.C. 154(b) by 0 days.

(21) Appl. No.: 13/355,164

(22) Filed: Jan. 20, 2012

(65) Prior Publication Data

US 2012/0187671 A1 Jul. 26, 2012

Related U.S. Application Data

(60) Provisional application No. 61/461,692, filed on Jan. 21, 2011.

(51) Int. Cl.
*B60R 22/195* (2006.01)
*B60R 22/48* (2006.01)
*B60R 22/46* (2006.01)
*B60R 21/13* (2006.01)
*B60R 21/0132* (2006.01)
*B60R 21/06* (2006.01)
*A47C 17/80* (2006.01)
*B60P 3/38* (2006.01)

(52) U.S. Cl.
USPC ...... 280/806; 280/807; 280/749; 296/190.02; 296/190.03; 5/9.1

(58) Field of Classification Search
USPC ............ 280/801.1, 806, 807, 748, 749, 753, 280/727; 296/190.02, 190.03; 5/118, 9.1, 5/94

See application file for complete search history.

(56) References Cited

U.S. PATENT DOCUMENTS

| | | | | | |
|---|---|---|---|---|---|
| 4,143,914 | A | * | 3/1979 | Klich | 297/465 |
| 4,630,324 | A | * | 12/1986 | Fligsten et al. | 5/94 |
| 5,131,682 | A | * | 7/1992 | Reed | 280/801.1 |
| 5,660,445 | A | * | 8/1997 | Murray | 297/485 |
| 5,727,814 | A | * | 3/1998 | White | 280/748 |
| 6,322,140 | B1 | * | 11/2001 | Jessup et al. | 297/216.17 |
| 6,565,120 | B2 | * | 5/2003 | Ganesan | 280/801.1 |
| 6,644,724 | B1 | * | 11/2003 | Penaloza et al. | 296/190.02 |
| 7,264,275 | B2 | * | 9/2007 | Wang et al. | 280/801.1 |
| 7,658,449 | B2 | * | 2/2010 | Burns | 297/465 |

* cited by examiner

*Primary Examiner* — Keith Frisby
(74) *Attorney, Agent, or Firm* — Mark Rodgers

(57) ABSTRACT

A rollover safety system for truck cab sleeper berths and other sleeper berths in moving vehicles. The system includes a rollover sensor which generates a signal in response to a rollover condition. The signal is used by a controller to tension a tether which is attached to a load bearing harness worn by a sleeper berth occupant. The tether is tensioned to prevent the occupant from injuriously contacting the roof and or walls of the berth The system moves the occupant away from the potentially injurious surfaces while allowing freedom of movement when there is no crash.

9 Claims, 3 Drawing Sheets

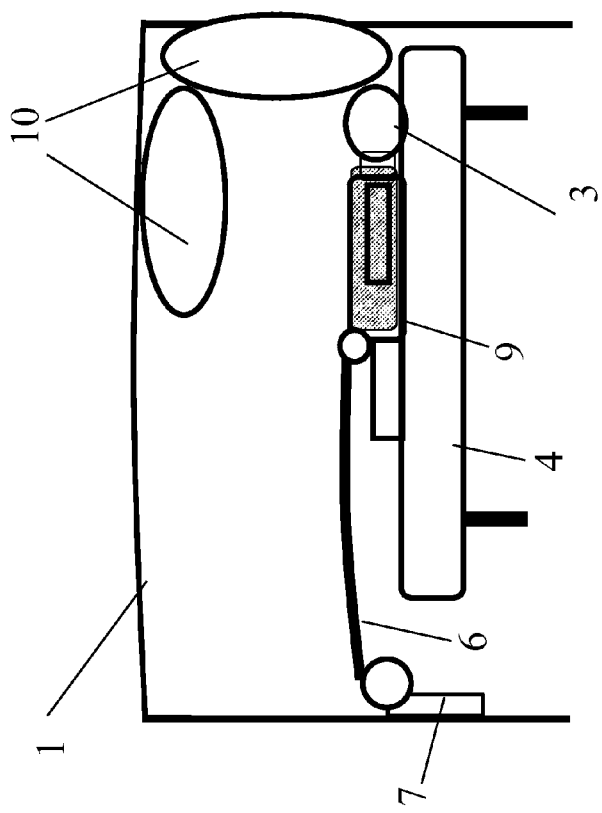
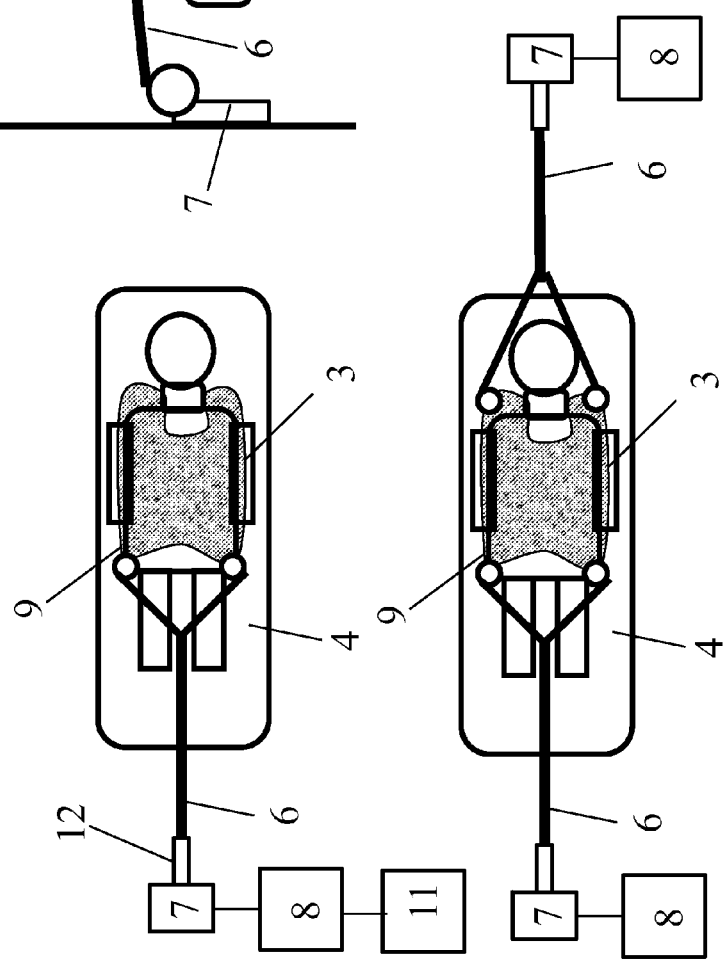
Fig. 4
Fig. 3

SLEEPER BERTH OCCUPANTS ROLLOVER PROTECTION

RELATED APPLICATIONS

This Application claims priority to U.S. Provisional Application, Ser. No. 61/461,692, filed Jan. 21, 2011

FEDERALLY SPONSORED RESEARCH

Not Applicable

SEQUENCE LISTING

Not Applicable

BACKGROUND OF THE INVENTION

The invention relates to sleeper berth occupant safety in a moving vehicle and in particular to a novel system for improving sleeper berth safety in a rollover accident.

Many long haul trucks and other vehicles which transport occupants for long distances have sleeper berths which are legally usable for an occupant to sleep in while the vehicle is moving. Such sleeper berths generally have some safety provisions, which are primarily designed for direct frontal collision type accidents. A typical sleeper berth safety system is shown in FIG. 1. An occupant 3 lies on a pad or mattress 4 in sleeper berth 1. The safety devices typically consist of safety lap belts 5, sometimes in conjunction with a net 2.

The inventor has discovered through rollover simulation testing that the systems of the type shown in FIG. 1 are not effective during rollover accidents particularly when the head is leading the person's body toward the intruding surfaces of the vehicle.

The problem is that the occupant, during a rollover, may in fact slip all or partially out of belts and net and his head may injuriously come into contact with the intruding roof and walls of the berth, particularly if the berth's structure is deformed during the accident. Thus the inventor has gathered significant evidence that this slippage occurs in existing sleeper berth safety systems even when the systems are in good working order and are utilized as designed. Thus it is the object of this invention to provide a safety system for sleeper berths that is effective during rollover accidents.

BRIEF SUMMARY OF THE INVENTION

The invention is a sleeper berth occupant safety system, for an occupant lying in a sleeper berth, including at least one tether, a tether retractor, a rollover sensor, a controller reading the rollover sensor, and controlling the tether tensioner, a load bearing harness, worn by the occupant and connected to the tether. In response to a signal indicating a rollover is occurring, the tether is tensioned to prevent the occupant from contacting the walls or roof of the berth (in conjunction with a net type system designed for frontal impacts). The tether retractor can be spring loaded to allow the tether to spool in and out of the retractor allowing the user the opportunity to move freely when not in a crash. When the system is activated in a rollover, an important feature of the system is that it moves the person away from the hazardous contact potential, thus preventing injurious head/neck contact. That is, the system physically moves the person in the direction away from the hazardous condition.

In one embodiment, the system also includes airbags actuated by the rollover sensor on at least one of the walls and roof of the berth, or that can be incorporated into the bed system itself In one embodiment, the tether retractor is a hypertensioner. In a particular version the hypertensioner is a motor driven take-up reel or belt winch. The motor may be a high rpm type actuated by a local safety power supply.

In another embodiment, the retractor is a pretensioner. And in a particular version, the pretensioner is one of a pyrotechnic pretensioner, pneumatic or mechanical.

In one embodiment, the tether attaches to the harness at two points in a y configuration. In another two tethers are utilized going to two attachments on the vest and the compartment.

BRIEF DESCRIPTION OF THE DRAWINGS

The invention will be better understood by referring to the following figures.

FIG. 3 shows an alternative tether connection.
FIG. 4 shows the invention with airbags.

DETAILED DESCRIPTION OF THE INVENTION

This invention can benefit from earlier work by the inventor relative to rollover accident, and in particular elements from patents U.S. Pat. Nos. 7,278,682, 7,216,931, and 7,644,799, incorporated by reference in their entirety.

Figure 1:
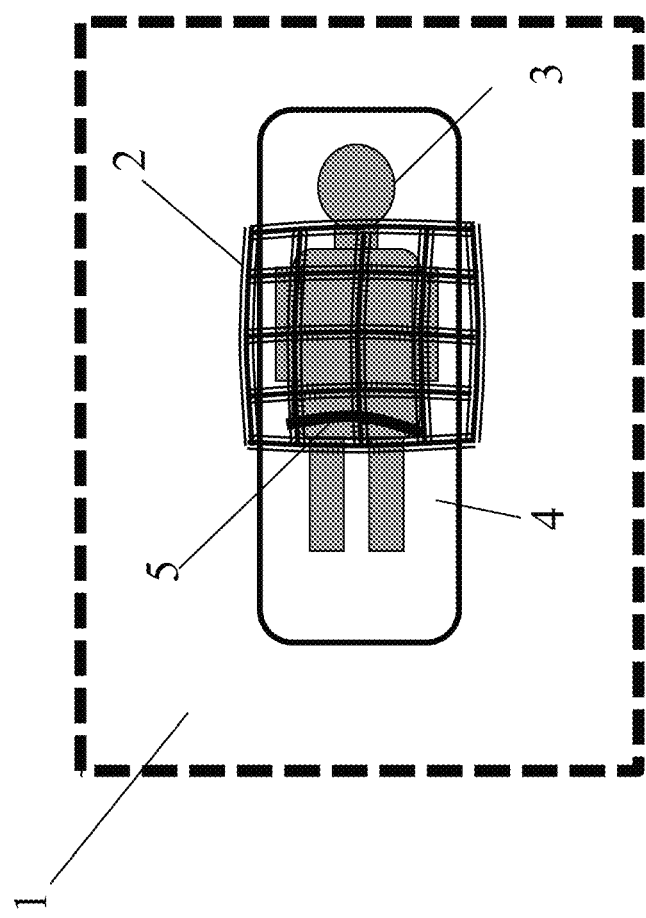
FIG. 1 shows the prior art.
Figure 2:
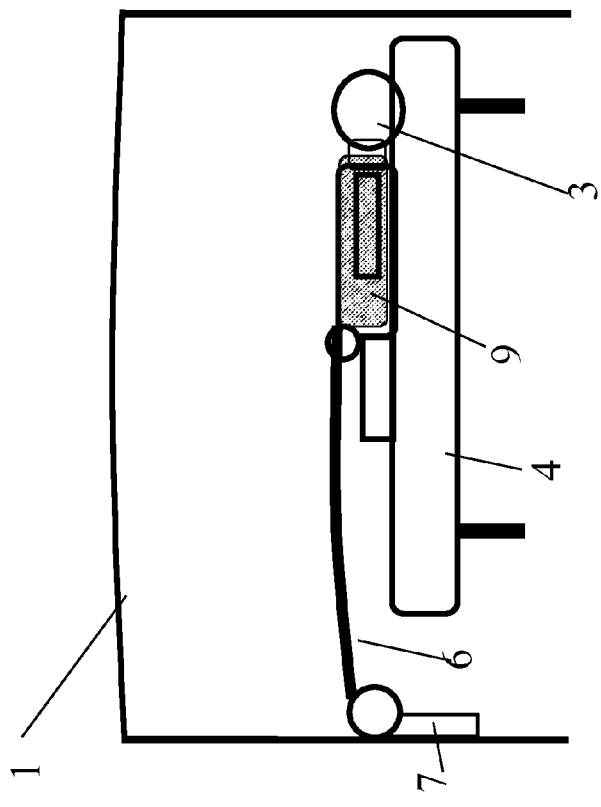
FIG. 2 shows a top down and side view schematic of the invention.
Figure 2:
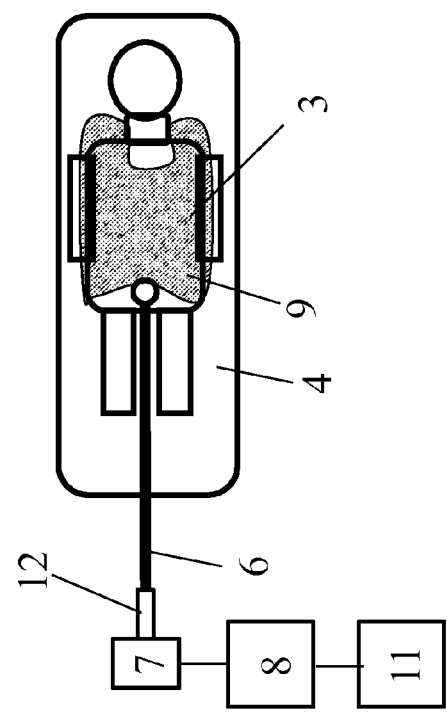

Referring to FIG. 2, the elements of the invention are shown. Occupant 3 is lying on pad 4 in sleeper berth 1. Occupant is wearing a load bearing harness 9, which may be a load bearing vest. One particular useful form of harness can be seat belt type material incorporated into a vest in a suitable load handling fashion sufficient to handle the expected loads and to distribute them in a suitable fashion. The harness 9 has a tether attachment point which is attached to a tether 6. The tether is fed from a retractor 7. Controller 8, at a minimum controls retractor 7 and either contains or reads a rollover sensor 11. In the event of a rollover condition detected by the sensor, the controller 8 operates the retractor 7 such that occupant 3 is tethered to avoid injurious contact with the roof and/or walls of sleeper berth 1. Preferably the retractor is a spring loaded spool known in the art so the occupant is free to move around and is not restricted in sleeping by the system when not in a crash.

FIG. 3 shows an alternative attachment scheme for tether 6, which in this version attached to two points on harness 9 in a y or yolk configuration. Other single or multiple point tether attachment schemes are possible.

FIG. 4 shows the system enhanced by the addition of airbags 10 suitably placed on the roof and/or walls of the berth 1. Although not shown in FIGS. 2-4 for clarity, it is envisioned that the belts or net of existing safety systems be used along with the rollover activated novel elements of the invention.

The system can work with one or more tethers connected to one or more tether retractors, with tensioners 12, including hypertensioner such as belt winches or pretensioning systems of the type known in seatbelt design. A high rpm motor, possibly with a dedicated local safety system power supply as described in the referenced applications, in conjunction with suitable gear boxes and take-up reels, coupling and other mounting hardware could be utilized for a hypertensioner system. A belt winch could be incorporated to wind the tether or tethers up on a cylinder rather onto a spool as a hypertensioning device, potentially with local high power actuators. Pyrotechnic, mechanical or pneumatic pretensioner systems for tightening the tethers may be employed and would be particularly suitable for multiple tethers. Potentially even static attachment points in conjunction with a net system could provide some benefit. The whole system can be retrofitted or just the harness and control system can be retrofitted if there is already an effectively designed and tested net system in place. The system is not expected to be activated in a frontal impact when a single tether is used; however, in multiple tether design configurations, activation may be desirable. The retractor preferably allows the tether to move freely, when the system has not been activated in a crash. The retractor can be designed to incorporate slight retracting tension for convenience if desired. A system preventing spool out during the impact is incorporated. In addition, components for the prevention of film spooling can also be incorporated into the tether retractor. In addition, force limiting can be incorporated. Occupant size considerations maybe incorporated into the control and tether system. The amount of tether retracted during activation can be controlled by the logic with the controller module. Activation of the overall system can be designed to occur when the roll direction creates a hazardous condition for the head/neck system. Warnings can be incorporated with regard to the expected occupant orientation as needed; typically the occupant orientation is highly predictable due to the layout of the compartment controls, but if not the system design should reflect such considerations and appropriate instructions provided to users.

The harness can be a vest which could incorporate pockets for everyday use and be constructed of light materials to enable use during normal trucking activities; pockets for maps, tickets, cards, identification, money, keys, insurance, and other items normally carried can be accommodated. The bulk of the material should be breathable and comfortable to wear. Seatbelt type material could be incorporated into the vest in a suitable load handling fashion.

The tether retractor take-up is intended to displace the occupant to a position known to prevent or mitigate head contact with the side wall. The controller may be a programmable device which would enable control software to determine occupant size and retract varying amounts of tether dependant on the expected occupant sizes. Occupants outside the capability of the system could be identified and users would be warned that their protection would be likely degraded compared others.

In conjunction with the harness vest tether/repositioning system, airbags could be incorporated in the bed, sidewall and/or roof panels to mitigate injury. Airbags of these sorts could be activated by an electronic control systems similar to that used for rollover side curtains for windows. The design of the airbags would be such as to redirect the occupant away from injurious contacts and would provide force limited loading to the occupant to avoid excessive neck articulation or loading. There could be single or multiple airbags that could be single or multi-chambered. The airbags could be controlled to deploy with time phase shifts enabling phased controlled motion of the occupant during the rollover process, with the intent of preventing excessive head/neck loading by reorientation of the occupant during the rollover process through use of the airbags.

The airbag systems could be designed so they are slow deploying so as not to be injurious as compared to typical fast acting airbags; these bags can deploy over much longer time periods for a rollover compared to a collision The tether retraction system could also be fairly slow acting compared to conventional pretensioners that act in a few milliseconds; comparatively these systems are acting over a much longer time period more like 100s of milliseconds due to the long duration of the rollover event. The "slow movement" of the occupant could performed over time periods of 100's milliseconds and not a few milliseconds. The slow roll rate of could allow the slow and safe deployment of "soft pillows" displacing the occupants laterally and away from the window opening.

The foregoing description of the embodiments of the present invention has shown, described and pointed out the fundamental novel features of the invention. It will be understood that various omissions, substitutions, and changes in the form of the detail of the systems and methods as illustrated as well as the uses thereof, may be made by those skilled in the art, without departing from the spirit of the invention. Consequently, the scope of the invention should not be limited to the foregoing discussions, but should be defined by appended claims.

I claim:

1. A sleeper berth occupant safety system, for an occupant lying in a sleeper berth, comprising;
   at least one tether,
   a tether retractor with tensioner,
   a rollover sensor,
   a controller reading the rollover sensor, and controlling the tether tensioner; and,
   a load bearing harness, worn by the occupant and connected to the tether, wherein;
   in response to a signal indicating a rollover is occurring, the tether is tensioned to move the occupant away from contacting the walls or roof of the berth operating in conjunction with a frontal impact safety system.

2. The system of claim 1 further comprising airbags actuated by the rollover sensor on at least one of the walls and roof of the berth.

3. The system of claim 1 wherein the tether retractor is a hypertensioner.

4. The system of claim 3 wherein the hypertensioner is at least one of a motor driven take-up reel or belt winch.

5. The system of claim 1 wherein the retractor is a pretensioner.

6. The system of claim 5 wherein the pretensioner is a pyrotechnic pretensioner.

7. The system of claim 1 wherein the tether attaches to the harness at two points in a y configuration.

8. The system of claim 1 further comprising at least one additional tether retractor and at least one additional tether.

9. The system of claim 1 wherein the tether retractor is a spring loaded spool allowing freedom of motion when not engaged.

* * * * *